United States Patent Office 2,952,525
Patented Sept. 13, 1960

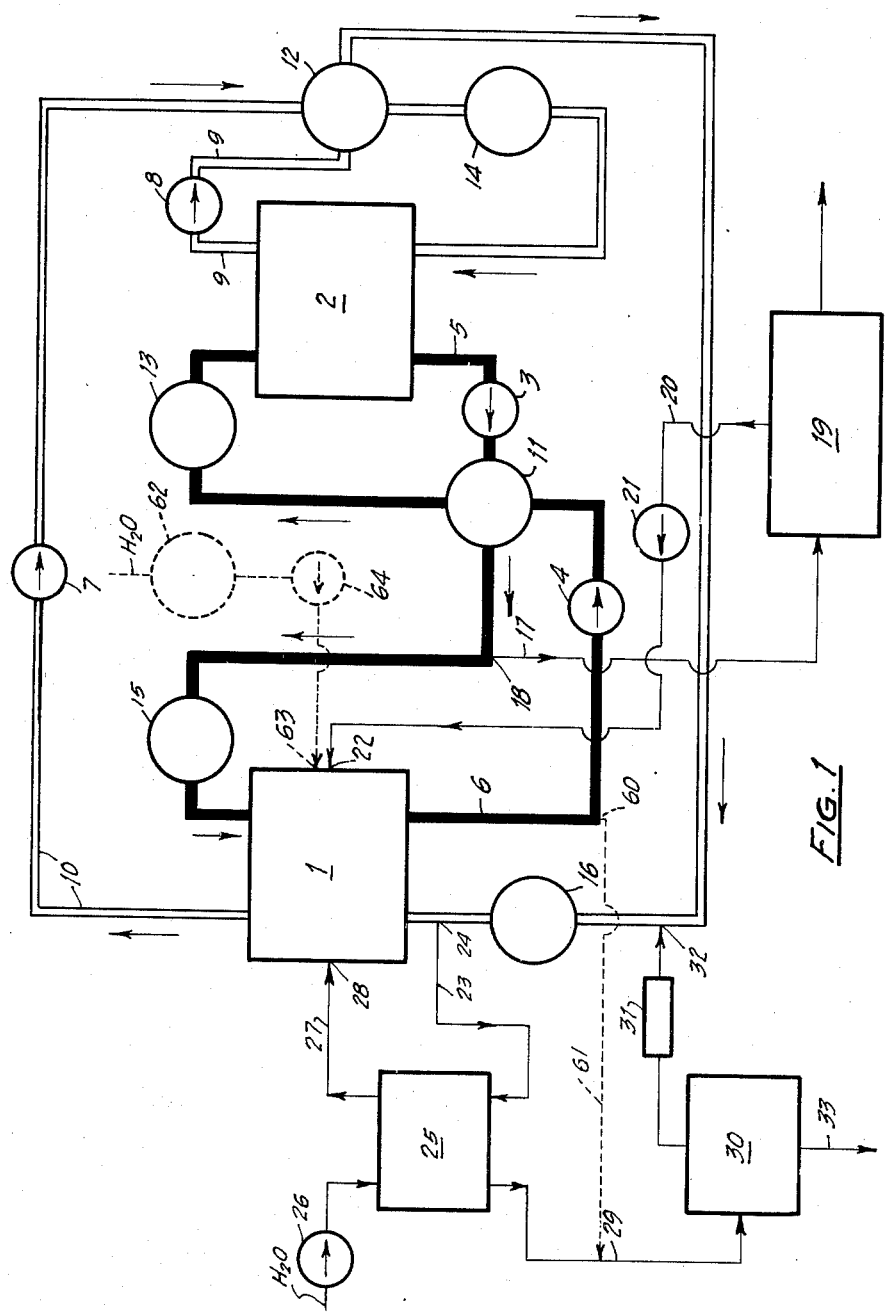

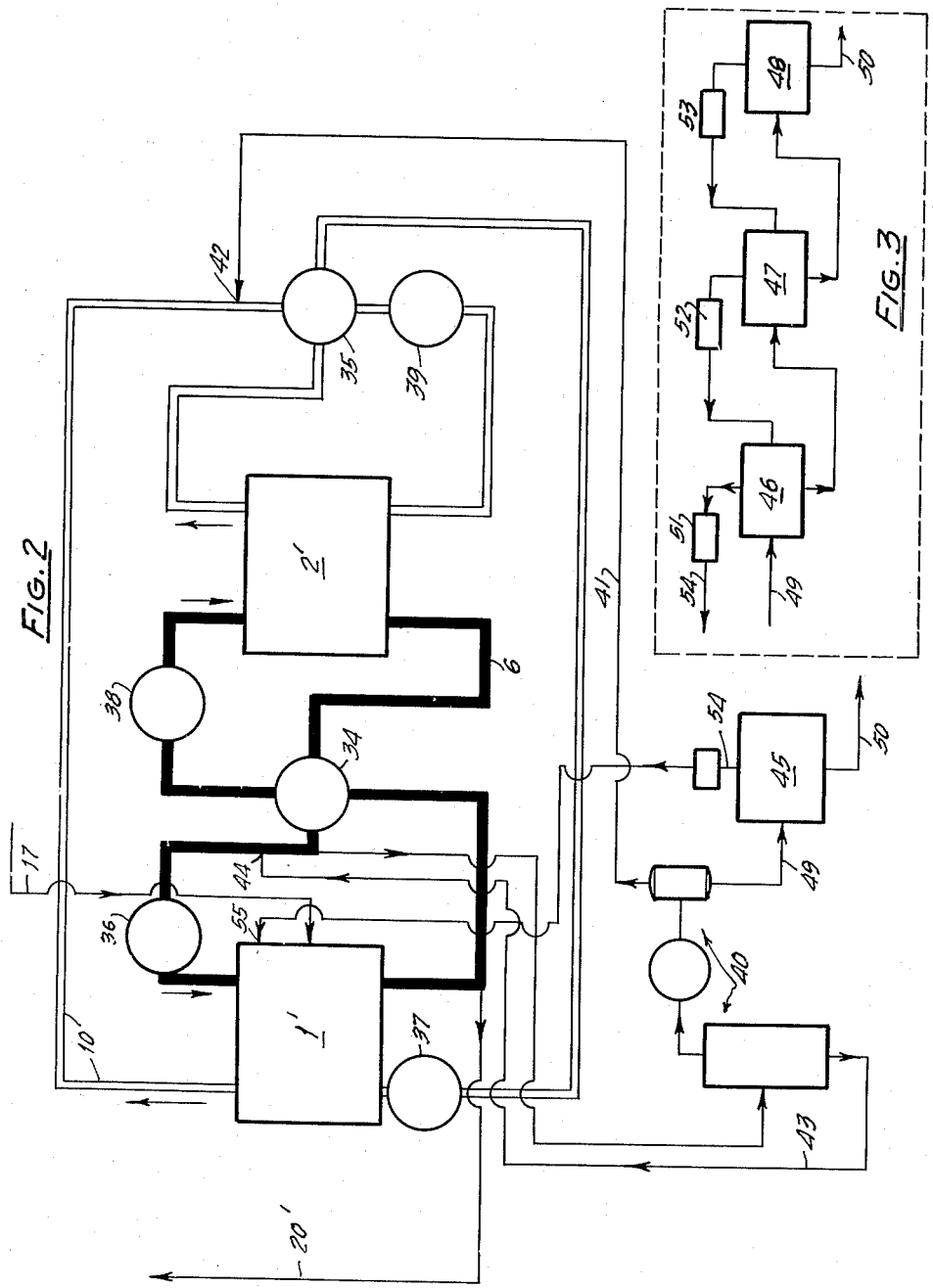

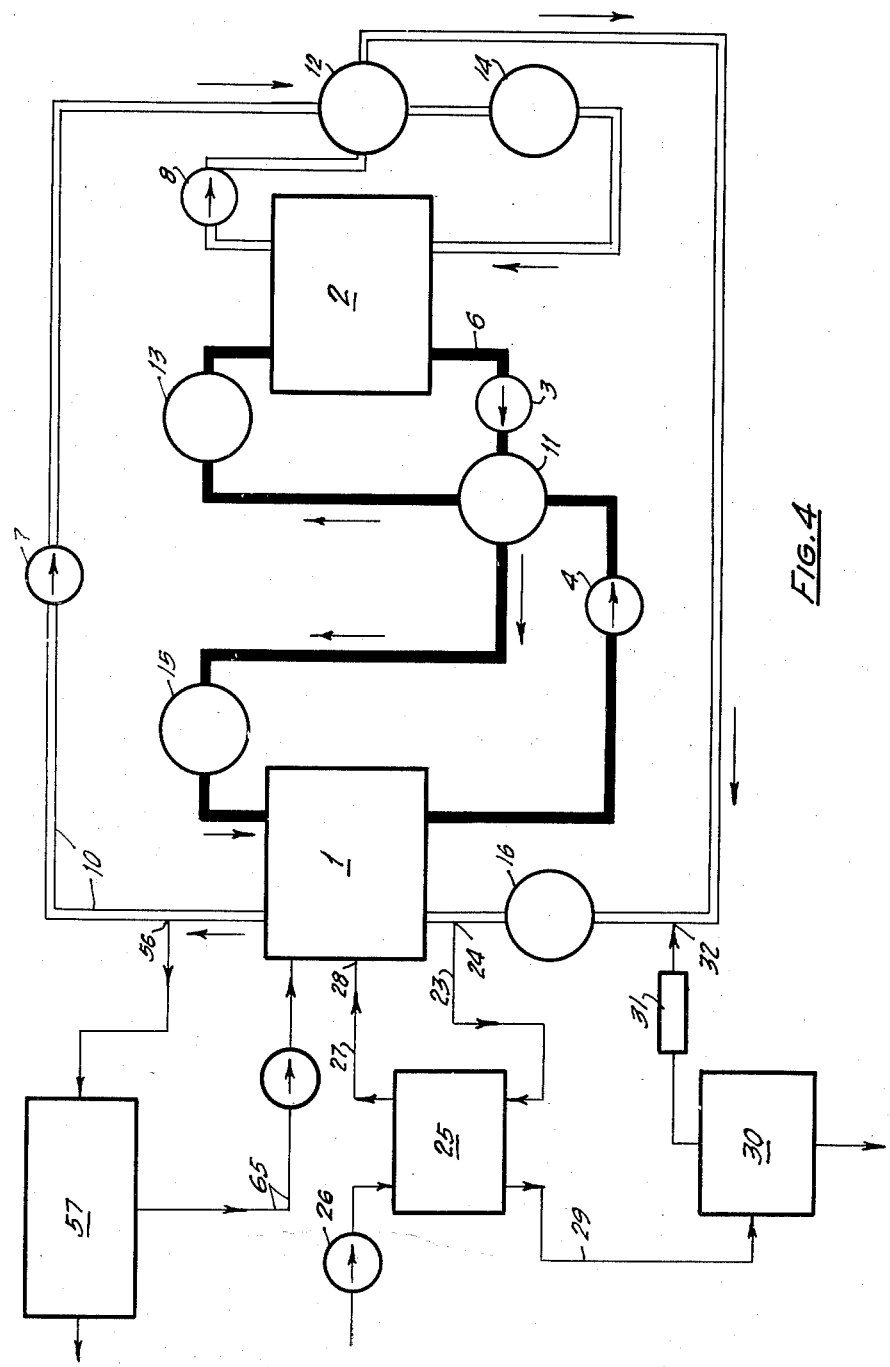

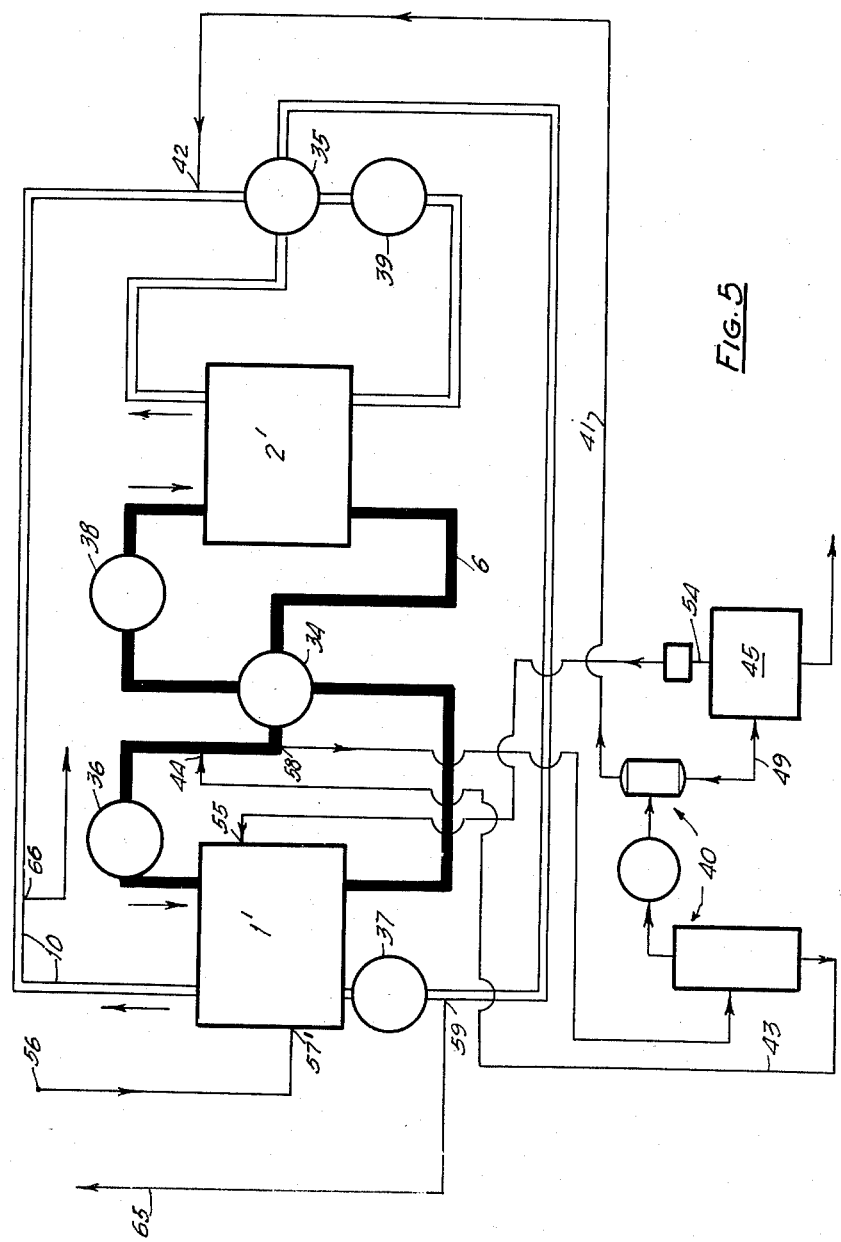

2,952,525
METHOD OF MANUFACTURING HEAVY WATER

Paul Harteck, Troy, N.Y., assignor to Rensselaer Polytechnic Institute, Troy, N.Y., a corporation Filed Oct. 20, 1955, Ser. No. 541,807

9 Claims. (Cl. 23—204)

My invention relates to the manufacture of heavy water and is an improvement in the method disclosed in my copending application Serial No. 411,675, filed February 23, 1954.

It has heretofore been proposed to produce deuterium oxide by effecting an exchange of deuterium between water and hydrogen sulfide as a gas, but a study of this procedure indicates that it has little or no advantage over other known methods. Comparatively small quantities of heavy water have also been produced by electrolysis, but the production thereof by these methods is not sufficient to supply the demand. Furthermore, it is not economical to operate an electrolysis plant for such a special purpose.

Since the vapor pressures of $D_2O$, HDO and $H_2O$ differ slightly it is possible to produce heavy water by distillation of normal water. However, one ton of normal water contains only about 150 grams of $D_2O$ and the production of $D_2O$ by a single distillation is only a few percent of the $D_2O$ content. It is obvious, therefore, that such a process is only practical in places where heat for the distillation costs practically nothing.

One of the objects of my invention is to provide a method which can be exercised in a relatively small, inconspicuous plant which can be built almost anywhere. Another object is to provide a method in which the energy needed to effect the exchange is comparatively small and hence the cost of operation is small as compared with any of the other methods used at the present time. A further object is to provide a method in which the cost of the necessary refrigeration is substantially reduced by making it possible to operate in a comparatively high temperature range.

In order economically to manufacture heavy water, the process should be one of isotope exchange because, theoretically, such an exchange requires little or no energy. In actual practice, however, energy must be expended for agitation, pumping, etc., in order to bring phases into the intimate contact necessary for the rapid establishment of equilibrium. Continuous counterflowing of the two phases is adapted to effect the desired exchange and thus provides the number of equilibrium stages necessary for efficient isotope separation.

In order to maintain the cost at a minimum, the substances used should be inexpensive; there should be a rapid rate of exchange of the hydrogen; the separation factor should be large and, therefore, should have a considerable temperatutre coefficient, the total volume of the system should be small which precludes the use of substances in gaseous form; extremes in temperautre should be avoided; the exchangeable hydrogen should constitute a large portion of the atoms of the molecules used in the system; and the two substances must be slightly miscible, but not too miscible.

I have discovered that water and hydrogen sulfide fulfill practically all of these conditions and I propose to use these substances in the manner described below and illustrated in the accompanying drawings in which—

Fig. 1 is a schematic diagram of a first stage showing the various elements necessary to effect an initial deuterium enrichment of ordinary water;

Fig. 2 is a schematic diagram of another following stage similar to Fig. 1 but embodying certain modifications;

Fig. 3 is a diagrammatic illustration showing how the water may be progressively enriched by passing it through three separate stages to produce substantially pure $D_2O$;

Fig. 4 is a schematic diagram showing the first stage of an alternate procedure; and Fig. 5 is a schematic diagram showing another stage following that shown in Fig. 4.

In the drawings, the water phase is illustrated by heavy black lines and the hydrogen sulfide phase by two parallel lines.

Referring first to Fig. 1, 1 and 2 represent confined zones such, for example, as towers through which counterflowing streams of water and hydrogen sulfide in liquid condition are forced to bring them into intimate, intermingling contact with each other; it being understood that the hydrogen sulfide is first compressed and cooled to change it from a gas to a liquid. As pointed out above, in order to effect an efficient hydrogen exchange, there should be a considerable temperature differential in the two zones. Merely for purposes of discussion, it will be assumed that zone 1 is maintained at a temperature of $+90°$ C., while zone 2 is maintained at a temperature of $+10°$ C. The system must be maintained under pressure sufficient to hold the hydrogen sulfide in liquid condition when at the higher temperature, and in order to lower the pressure necessary to maintain the hydrogen sulfide in the liquid state, a substance is incorporated therewith which will dissolve in it. The substance should have a low vapor pressure compared to that of the hydrogen sulfide and be miscible with it, but not miscible in water. Since this substance has a lower vapor pressure, the total pressure over a mixture of this substance with hydrogen sulfide will be considerably less than that of pure hydrogen sulfide at the same temperature. Furthermore, the addition of such a substance to the hydrogen sulfide will prevent the formation of a cryohydrate.

The amount of lowering of the total pressure will depend on the amount of substance added. The amount of substance added should not be more than two or three times the volume of the original hydrogen sulfide stream. The total pressure from such an addition will drop to a half or a third of the former value at that temperature depending on the substance. This large decrease in pressure will allow the upper temperature limit for operation to increase by twenty to sixty degrees centigrade. Such an increase in temperature will in turn allow the lower temperature limit also to increase where refrigeration cost will become cheaper. With this change the antifreeze in the water phase need not be used, allowing direct feed of fresh water into the system and removing the depleted water. Both the hydrogen sulfide and the added substance are stripped out of the depleted water by the use of steam as done previously, where only hydrogen sulfide was in the waste water.

Substances which might be used as additives should have the following general properties:

(1) Soluble in hydrogen sulfide
(2) Low solubility in water
(3) Comparatively low vapor pressure to that of hydrogen sulfide, roughly one-fourth at 80° C.
(4) Low molecular volume, i.e., less than 125 milliliters per gram mole
(5) Density less than water or much greater Many substances may fulfill these requirements such as:

(1) Ethylene di-chloride
(2) Carbon disulfide
(3) Ethyl chloride (4) Butane
(5) Pentane
(6) Methanethiol
(7) Ethanethiol Other additives such as the following fluorochloromethanes and ethanes—

Trichlorofluoromethane, $CCl_3F$
Dichlorodifluoromethane, $CCl_2F_2$
Chlorotrifluoromethane, $CClF_3$
Dichloromonofluoromethane, $CHCl_2F$
Trichlorotrifluoroethane, $C_2Cl_3F_3$ which are non-toxic, non-flammable and non-corrosive may be used, but they are only fairly suitable and probably could not be used economically because of their relatively high molecular volume.

Since the heating capacity of the water is small as compared to that of hydrogen sulfide, it is advantageous to increase it by the addition of some inert solvent, such as alcohol, until the heat capacities of the two phases are approximately equal. However, such an addition may be prevented if the resulting streams become too large to make it economical, but large inert streams may be used for heat exchange purposes.

In order to maintain the necessary pressure in the system and effect counterflowing currents of the two phases through the zones 1 and 2, pumps 3 and 4 are introduced into water phase lines 5 and 6, and pumps 7 and 8 are introduced in the pipe lines 9 and 10 carrying the hydrogen sulfide phase.

A transfer of deuterium from the hydrogen sulfide to the water takes place in the cold zone 2, while a transfer of deuterium from the water to the hydrogen sulfide takes place in the warm zone 1. Since the primary object is to effect a deuterium enrichment of the water, the pumps 7 and 8 are of substantially greater capacity than the pumps 3 and 4, so that the volume of the hydrogen sulfide phase in the system is several times that of the water phase. For example, the hydrogen sulfide phase may be circulated at the rate of 1000 gallons per minute, while the water is circulated only at the rate of 200 gallons per minute where a production of about 10 tons of heavy water per year is desired.

The circulation and recirculation of the two phases results in a high concentration of deuterium oxide in the stream 5 flowing from the low temperature zone 2 and a high concentration of deuterium sulfide in the stream 10 flowing out of the zone of high temperature. Concurrently, the hydrogen sulfide in the stream 9 flowing out of the zone 2 of low temperature and the water in the stream 6 flowing out of zone 1 of high temperature will contain relatively low concentrations of deuterium sulfide and deuterium oxide, respectively.

Since the stream 5 flowing out of the zone 2 is at low temperature and must be heated before it passes into zone 1, and the stream 6 flowing out of zone 1 must be cooled before it enters zone 2, a heat exchange apparatus 11 is employed to effect a transfer of heat from the stream 6 to the stream 5. Similarly, a heat exchange apparatus 12 is employed to effect a transfer of heat from the warm stream 10 flowing out of zone 1 to the cold stream 9 flowing out of zone 2. As illustrated, heat exchanges are effected between two portions of the water phase and between two portions of the hydrogen sulfide phase, but it is to be understood that the exchanges may be effected between portions of the water phase and portions of the hydrogen sulfide phase which will be more efficient than that illustrated if the heat capacities of the two phases can be made approximately equal in the manner pointed out above.

Since the low temperature streams acquire heat from the surroundings, heat extraction or refrigeration units 13 and 14 are provided for cooling the water phase and the hydrogen sulfide phase streams before they enter the cold zone 2, and heating units 15 and 16 are provided for heating the water and hydrogen sulfide phase streams, respectively, before they enter the warm zone 1.

The circulation of the streams as aforesaid will increase the concentration of $D_2O$ in the water phase from 1 part in 7000 to about 1 part in 70 before a steady state is reached.

A small stream 17 of the enriched water phase may then be withdrawn from the line 5 at the point 18 to an electrolytic enrichment unit 19 and the stripped water phase returned through line 20 and pump 21 to an appropriate point 22 in the first stage.

In order to compensate for the deuterium removed from the system in the stream 17, deuterium may be added by withdrawing a small stream 23 from the hydrogen sulfide phase at a point, such as 24, where it is depleted in deuterium, and passed through an exchange zone 25 through which a counterflowing stream of deaerated water is forced by the pump 26. The zone 25 is maintained at substantially the same temperature as the zone 1. Thus, the depleted hydrogen sulfide phase acquires deuterium from the water and flows back as stream 27 into an appropriate point 28 in the main system. The water leaving the zone 25 in stream 29 flows into the separating unit 30, the hydrogen sulfide phase contained therein is recovered, compressed and cooled to a liquid condition in apparatus 31 and returned to the depleted hydrogen sulfide phase in the main system at the point 32. The water, free from the hydrogen sulfide and part of its deuterium content may be discharged as waste through the drain 33.

On the other hand, in the event no alcohol or other inert solvent is incorporated in the water for the purpose of increasing its heat capacity, the water leaving zone 1 in the stream 6, which is substantially depleted of its deuterium but contains hydrogen sulfide, may be withdrawn from the stream 6 at an appropriate point 60 and be delivered to the hydrogen sulfide separating unit, through lines 61 and 29, from which the hydrogen sulfide is returned to the circulating stream thereof at an appropriate point 32. The water, free from the hydrogen sulfide may then be discharged as waste through the drain 33, and fresh, deaerated water, heated by the unit 62 to the temperature of zone 1, delivered directly to an appropriate point 63 in zone 1 through the pump 64.

Further enrichment of the water may be accomplished by utilizing additional stages of the two-temperature process described above to produce a predetermined concentration of deuterium oxide in the final effluent stream. Thus, referring to Fig. 2, the small stream 17 withdrawn from the stage shown in Fig. 1 may be further enriched by delivering it to a warm zone 1′ of another stage of the system. Concentration to the desired level is effected by circulation through the zones 1′ and 2′ thereof operating at high and low temperatures, respectively. Heat exchange units 34 and 35, similar to the heat exchange units 11 and 12, are provided and additional heating units 36 and 37, similar to the units 15 and 16, and refrigerating units 38 and 39, similar to the units 13 and 14, are also provided. Although no pumps are shown in Fig. 2 similar to the pumps 3, 4, 7 and 8 of Fig. 1, it is to be understood that such pumps are provided in the stage shown in Fig. 2. Since smaller volumes are processed in that and any following stages, the zones 1′ and 2′ and the various units mentioned may be smaller than the corresponding zones and units in the preceding stage.

Prior to employing the electrolytic enrichment scheme, the concentrated water phase may form the feed to still another stage and the processing repeated until the desired enrichment is achieved. However, prior to employing the electrolytic enriching scheme, it will be necessary to remove the dissolved hydrogen sulfide from the enriched water phase. This may be accomplished in a distillation desorption apparatus 40 from which hydrogen sulfide in the form of gas is removed, cooled, compressed and returned through the line 41 to the main system at an appropriate point 42. A depleted water phase stream 43 can be returned to an appropriate point 44 in the main system, while the enriched water phase is delivered to the device 45 where a final concentration of deuterium in the water may be effected by electrolysis.

Fig. 3 is a detailed diagram of the electrolytic device 45 which may comprise several units, 46, 47 and 48, such as shown in Fig. 3. Thus, the enriched water from which the hydrogen sulfide has been separated is introduced through the pipe 49. Further enrichment depends on the fact that the ratio of heavy hydrogen to normal hydrogen evolved as gases from the electrolytic units is less than the corresponding ratio in the residual liquid. As a result, in passing through a sufficient number of units in the manner indicated, a liquid stream 50 of substantially pure deuterium oxide may be obtained as a final product. Gaseous hydrogen and deuterium evolved from the units 46, 47 and 48 are converted to their oxides in the reactors 51, 52 and 53, respectively. Ordinary air or oxygen-enriched air may be used to combine with the gaseous deuterium hydrogen stream in the reactors. Condensed and cooled products of the reactions consisting of a mixture of normal and heavy water are returned to the preceding electrolytic cell in each case as indicated, except for the stream 54 flowing from the first unit 46 which is returned to an appropriate point 55 in the main system.

An alternate method of carrying out the enrichment is shown in Figs. 4 and 5, wherein 1 and 2 and 1' and 2' are the high and low temperature zones in said figures respectively. In Fig. 4 pumps 3, 4, 7 and 8; the heat exchange units 11 and 12; the refrigerating units 13 and 14; and the heating units 15 and 16; are the same as in Fig. 1.

Here, instead of using the water phase as the source of deuterium to the enriching units, the liquid hydrogen sulfide stream is used. This is taken from the first stage of enrichment at a point 56 as a portion of the stream 10, and forms the feed to the next stage 57 of the enriching apparatus, shown more in detail in Fig. 5.

To compensate for the loss in deuterium due to that withdrawn from point 56 with the liquid containing the enriched hydrogen sulfide, the same procedure as that described in connection with Fig. 1 is followed. Thus, liquid containing depleted hydrogen sulfide is withdrawn through pipe 23 from an appropriate point 24, run through the exchange zone 25, at the temperature of the zone 1, in a direction counter to that of a stream of de-aerated water from the pump 26, where it is enriched, and returned through pipe 27 to the main stage at an appropriate point 28. Liquid containing the deuterium depleted water and some hydrogen sulfide is delivered through pipe 29 to unit 30 wherein the hydrogen sulfide is separated from the water, cooled and compressed to liquid form in unit 31, and returned to the main stage at an appropriate point 32.

Referring now to Fig. 5, the zones 1' and 2'; the heat exchange units; the refrigerating units; and the heating units may be the same as shown in Fig. 2 and are indicated by the same numerals. As mentioned above in connection with Fig. 2, the volumes of the zones 1' and 2' may be much smaller than those of the first stages shown in Figs. 1 and 4. No circulating pumps are shown in Fig. 5 but it is to be understood that such pumps are used although they may be of smaller capacity than the first stage pumps.

The liquid containing the enriched hydrogen sulfide which is withdrawn from the previous stage at point 56 (see Fig. 4) is delivered to the next stage shown in Fig. 5 at point 57'. The hydrogen sulfide phase is circulated through pipe line 10, heat exchange unit 35, refrigerating unit 39, heating unit 37, and through the zones 1' and 2' in a direction counter to that of the water phase which is circulated through heat exchange unit 34, heating unit 36, refrigerating unit 38, and through the zones 1' and 2'.

Liquid containing deuterium enriched water is withdrawn from this stage at an appropriate point 58 and passes through the distillation desorption apparatus 40, similar to that described in connection with Fig. 2, wherein the hydrogen sulfide is separated from the water, cooled and compressed to liquid form and returned to the main system through pipe 41 at point 42, as in Fig. 2.

The depleted water phase stream 43 may be returned to an appropriate point 44 in the main system, while the enriched water phase may be delivered to the apparatus 45 for final concentration of the deuterium in the water by electrolysis. The apparatus 45 may comprise several units as described in connection with Fig. 3. The deuterium depleted water from 45 is returned through pipe 54 to an appropriate point 55 in the main system, as in Fig. 2.

The loss in deuterium in the main system may be compensated by withdrawing a part of the depleted hydrogen sulfide phase from the point 59 and delivering it to zone 1 of the immediately preceding stage through line 65 (see also Fig. 4).

If desired, the hydrogen sulfide phase may be further enriched in another stage by withdrawing part thereof from an appropriate point such as 66.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. Those steps in the method of manufacturing heavy water which comprise compressing and cooling hydrogen sulfide until it is in a liquid state and incorporating therewith a substance miscible with said hydrogen sulfide but substantially immiscible with water, having a vapor pressure substantially less than that of said hydrogen sulfide, and selected from the group consisting of ethylene dichloride, carbon disulfide, ethyl chloride, butane, pentane, methanethiol, ethanethiol, trichlorofluoromethane, dichlorodifluoromethane, chlorotrifluoromethane, dichloromonofluoromethane and trichlorotrifluoroethane, whereby to reduce the pressure normally required to maintain the hydrogen sulfide phase in liquid condition at a temperature above 0° C., and prevent the formation of a cryohydrate when said hydrogen sulfide phase is mixed with water; producing counterflowing, intermingling streams of water and said hydrogen sulfide phase through two separate zones at substantially different temperatures, but above 0° C., while maintaining temperature-pressure relations in said zones which will maintain said hydrogen sulfide phase and said water in liquid condition, to effect a transfer of deuterium from said hydrogen sulfide phase to said water in the zone of lower temperature and a transfer of deuterium from said water to said hydrogen sulfide phase in the zone of higher temperature; and withdrawing deuterium enriched liquid from one of said streams.

2. The steps set forth in claim 1 in which the liquid withdrawn is water.

3. The steps set forth in claim 1 in which the liquid withdrawn is from the hydrogen sulfide phase.

4. Those steps in the method of manufacturing heavy water which comprise compressing and cooling hydrogen sulfide until it is in a liquid state and incorporating therewith a substance miscible with said hydrogen sulfide but substantially immiscible with water, having a vapor pressure substantially less than said hydrogen sulfide and selected from the group consisting of ethylene dichloride, carbon disulfide, ethyl chloride, butane, pentane, methanethiol, ethanethiol, trichlorofluoromethane, dichlorodifluoromethane, chlorotrifluoromethane, dichloromonofluoromethane and trichlorotrifluoroethane, whereby to reduce the pressure normally required to maintain the hydrogen sulfide phase in liquid condition at a temperature above 0° C., and prevent the formation of a cryohydrate when said hydrogen sulfide phase is mixed with water; producing circulating, counterflowing, intermingling streams of water and said liquid hydrogen sulfide phase, through two separate zones at substantially different temperatures, but above 0° C., while maintaining pressure-temperature relations in said zones which will maintain both streams in liquid condition; subjecting each of said streams to heat after it flows from the zone of lower temperature and before it enters the zone of higher temperature, and to a refrigerating treatment after it leaves the zone of higher temperature and before it enters the zone of lower temperature; whereby a transfer of deuterium from said hydrogen sulfide phase to said water will be effected in said zone of lower temperature, and a transfer of deuterium from said water to said hydrogen sulfide phase will be effected in said zone of higher temperature; and withdrawing deuterium enriched liquid from one of said streams.

5. Those steps in the method of manufacturing heavy water which comprise compressing and cooling hydrogen sulfide until it is in a liquid state and incorporating therewith a substance miscible with said hydrogen sulfide but substantially immiscible with water, having a vapor pressure substantially less than said hydrogen sulfide and selected from the group consisting of ethylene dichloride, carbon disulfide, ethyl chloride, butane, pentane, methanethiol, ethanethiol, trichlorofluoromethane, dichlorodifluoromethane, chlorotrifluoromethane, dichloromonofluoromethane and trichlorotrifluoroethane, whereby to reduce the pressure normally required to maintain the hydrogen sulfide phase in liquid condition at a temperature above 0° C., and prevent the formation of a cryohydrate when said hydrogen sulfide phase is mixed with water; producing circulating, counterflowing, intermingling streams of water and said liquid hydrogen sulfide, phase, through two separate zones at substantially different temperatures, but above 0° C., while maintaining pressure-temperature relations in said zones which will maintain both streams in liquid condition; effecting a transfer of heat from the liquids flowing out of the zone of higher temperature to the liquids flowing out of the zone of lower temperature; subjecting said liquids to additional heat before entering the zone of higher temperature and to refrigeration before entering the zone of lower temperature; whereby a transfer of deuterium from said water to said hydrogen sulfide phase will be effected in the zone of higher temperature, and a transfer of deuterium from said hydrogen sulfide phase to said water will be effected in the zone of lower temperature; and withdrawing deuterium enriched liquid from one of said streams.

6. Those steps in the method of manufacturing heavy water which comprise compressing and cooling hydrogen sulfide until it is in a liquid state and incorporating therewith a substance miscible with said hydrogen sulfide but substantially immiscible with water, having a vapor pressure substantially less than that of said hydrogen sulfide and selected from the group consisting of ethylene dichloride, carbon disulfide, ethyl chloride, butane, pentane, methanethiol, ethanethiol, trichlorofluoromethane, dichlorodifluoromethane, chlorotrifluoromethane, dichloromonofluoromethane and trichlorotrifluoroethane; whereby to reduce the pressure normally required to maintain the hydrogen sulfide phase in liquid condition at a temperature above 0° C. and prevent the formation of a cryohydrate when said hydrogen sulfide phase is mixed with water; producing counterflowing, intermingling streams of water containing an inert solvent adapted to make its heat capacity approximately equal to that of the hydrogen sulfide phase, and said hydrogen sulfide phase through two separate zones at substantially different temperatures, but above 0° C., while maintaining temperature-pressure relations in said zones which will maintain said hydrogen sulfide phase and said water in liquid condiiton, to effect a transfer of deuterium from said hydrogen sulfide phase to said water in the zone of lower temperature and a transfer of deuterium from said water to said hydrogen sulfide phase in the zone of higher temperature; and withdrawing deuterium enriched liquid from one of said streams.

7. Those steps in the method of making heavy water which comprise effecting a first deuterium enrichment of water by producing circulating, counterflowing, intermingling streams of said water and hydrogen sulfide in a liquid state containing a substance miscible therewith but substantially immiscible with water, having a vapor pressure substantially less than said hydrogen sulfide, and selected from the group consisting of ethylene dichloride, carbon disulfide, ethyl chloride, butane, pentane, methanethiol, ethanethiol, trichlorofluoromethane, dichlorodifluoromethane, chlorotrifluoromethane, dichloromonofluoromethane and trichlorotrifluoroethane, through two separate zones at substantially different temperatures, but above 0° C.; withdrawing liquid containing enriched water from said circulating mass; separating said enriched water from the other liquids; subjecting it to further deuterium enrichment by circulating it in intermingling contact with liquid hydrogen sulfide, containing a substance selected from the above mentioned group, through two other separate zones at substantially different temperatures, but above 0° C.; withdrawing liquid containing enriched water from the last mentioned circulating mass; and thereafter separating the heavy water from the withdrawn liquid.

8. The steps set forth in claim 7 in which the temperatures of said zones differ by more than 40° C.

9. Those steps in the making of heavy water which comprise effecting a first deuterium enrichment of water by producing circulating, counterflowing, intermingling streams of said water and hydrogen sulfide in a liquid state through two separate zones of substantially different temperature, but above 0° C.; said hydrogen sulfide containing a substance miscible therewith but substantially immiscible with water, having a vapor pressure substantially less than said hydrogen sulfide, and selected from the group consisting of ethylene dichloride, carbon disulfide, ethyl chloride, butane, pentane, methanethiol, ethanethiol, trichlorofluoromethane, dichlorodifluoromethane, chlorotrifluoromethane, dichloromonofluoromethane and trichlorotrifluoroethane; withdrawing liquid containing deuterium enriched water from the circulating mass; and compensating for the reduction in the deuterium content of said circulating mass due to the withdrawing of said enriched water, by withdrawing liquid containing hydrogen sulfide from said mass at a point where it has a comparatively low deuterium content; effecting a deuterium enrichment of said withdrawn hydrogen sulfide by circulating and intermingling it with a counterflowing stream of water in a third separate zone at a temperature of the order of that one of the first mentioned zones which is the higher; and returning it to said zone of higher temperature.

References Cited in the file of this patent

UNITED STATES PATENTS

| | | |
|---|---|---|
| 2,668,419 | Mapes | Feb. 9, 1954 |
| 2,741,543 | Urey | Apr. 10, 1956 |
| 2,787,526 | Spevack | Apr. 2, 1957 |

OTHER REFERENCES

Mellor: "Comprehensive Treatise on Inorganic and Theoretical Chemistry," vol. X, 1930, p. 128.

Selak et al. in "Chemical Engineering Progress," vol. 50, No. 5, pages 221 to 229.